United States Patent
Tsai et al.

(10) Patent No.: US 9,841,298 B1
(45) Date of Patent: Dec. 12, 2017

(54) MEASUREMENT DEVICE FOR LINEAR STAGE

(71) Applicant: Metal Industries Research And Development Centre, Kaohsiung (TW)

(72) Inventors: Hsiu-An Tsai, Kaohsiung (TW); Shuo-Ching Chen, Kaohsiung (TW); Kuo-Yu Chien, Meishan Township (TW)

(73) Assignee: Metal Industries Research And Development Centre, Kaohsiung (TW)

(*) Notice: Subject to any disclaimer, the term of this patent is extended or adjusted under 35 U.S.C. 154(b) by 0 days.

(21) Appl. No.: 15/394,910

(22) Filed: Dec. 30, 2016

(51) Int. Cl.
| G01D 5/30 | (2006.01) |
| G01B 11/27 | (2006.01) |
| G01D 5/26 | (2006.01) |
| G02B 5/18 | (2006.01) |

(52) U.S. Cl.
CPC ............ *G01D 5/30* (2013.01); *G01B 11/272* (2013.01); *G01D 5/264* (2013.01); *G02B 5/1861* (2013.01)

(58) Field of Classification Search
CPC .. G01J 4/00; G01D 5/264; G01D 5/30; G01B 11/272; G01B 11/04
USPC .................................................. 356/369, 244
See application file for complete search history.

(56) References Cited

U.S. PATENT DOCUMENTS

| 7,884,512 B2 | 2/2011 | Horng et al. | |
| 7,991,169 B2 | 8/2011 | McHugh et al. | |
| 8,072,120 B2* | 12/2011 | Awtar | G05G 5/03 310/328 |
| 9,255,788 B1* | 2/2016 | Tsai | G01B 11/002 |
| 2005/0272046 A1* | 12/2005 | Schermer | G01N 21/253 435/6.11 |
| 2014/0285122 A1* | 9/2014 | Lu | H02K 21/24 318/135 |
| 2016/0084712 A1* | 3/2016 | Johnson | G01J 3/4535 356/452 |

FOREIGN PATENT DOCUMENTS

| TW | I320688 | 2/2010 |
| TW | I345878 | 7/2011 |

* cited by examiner

*Primary Examiner* — Roy M Punnoose
(74) *Attorney, Agent, or Firm* — Akerman LLP; Peter A. Chiabotti

(57) ABSTRACT

A measurement device for a linear stage includes a two-dimensional grating and a measurement unit respectively disposed on first and second moving stages of the linear stage. The measurement unit includes a light source, a two-dimensional sensor and a processor. The light source emits incident light to the two-dimensional grating so that the incident light is reflected thereby to result in reflection light. The two-dimensional sensor receives the reflection light and converts the same to a reflection signal. The processor receives the reflection signal and determines accordingly a first rotational angle, and first and second displacement components of a displacement of the first moving stage.

6 Claims, 4 Drawing Sheets

MEASUREMENT DEVICE FOR LINEAR STAGE

FIELD

The disclosure relates to a measurement device and more particularly to a measurement device for a linear stage.

BACKGROUND

Linear stages are widely utilized for ultra precision manufacturing in industries of optical electronics, semiconductor and mechanics. A linear stage includes a first moving stage configured to move in a first moving direction, and a second moving stage configured to move in a second moving direction. Ideally, the first and second moving directions are perpendicular to each other. However, several kinds of errors exist in reality so perpendicularity cannot be ensured, thereby hindering promotion of precision in manufacturing.

Conventional measurement devices like those disclosed in Taiwanese Patent Nos. I345878 and I320688 are implemented by a plurality of light sources and a plurality of sensors to emit incident light beams to the linear stage, to receive reflection light beams resulting from reflection of the incident light beams by the linear stage, and to determine errors associated with the linear stage. However, since multiples sets of light sources and sensors are required, a higher cost and greater complexity of implementation of the above-mentioned conventional measurement devices may be inevitable.

SUMMARY

Therefore, an object of the disclosure is to provide a measurement device for a linear stage that can alleviate at least one of the drawbacks of the prior art.

According to the disclosure, the measurement device is for a linear stage. The linear stage is defined in a coordinate system which has an X-axis, a Y-axis and a Z-axis perpendicular to each other, and includes a first moving stage configured to move in a first moving direction that is substantially parallel to the X-axis, and a second moving stage configured to move in a second moving direction. The measurement device includes a two-dimensional grating to be disposed on the first moving stage, and a measurement unit to be disposed on the second moving stage. The measurement unit includes a light source, a two-dimensional sensor and a processor. The light source is configured to emit incident light to the two-dimensional grating so that the incident light is reflected by the two-dimensional grating to result in reflection light. The two-dimensional sensor is configured to receive the reflection light and to convert the same to a reflection signal. The processor is configured to receive the reflection signal, and to determine based on the reflection signal a first rotational angle of the first moving stage about the Z-axis, a first displacement component of a displacement of the first moving stage on the X-Y plane defined by the X-axis and the Y-axis, and a second displacement component of the displacement of the first moving stage on the X-Z plane.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
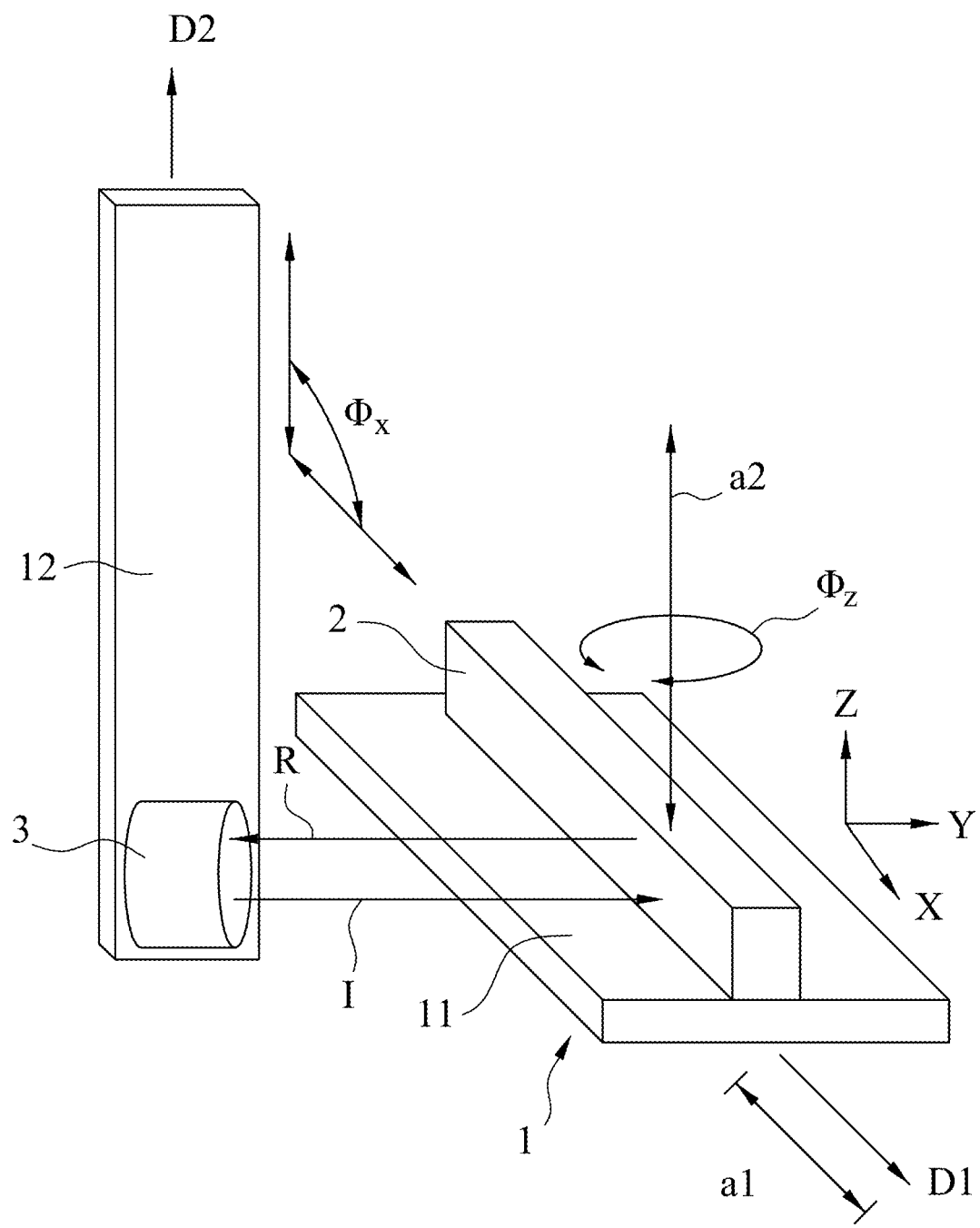
FIG. 1 is a perspective view illustrating a first embodiment of a measurement device for a linear stage according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
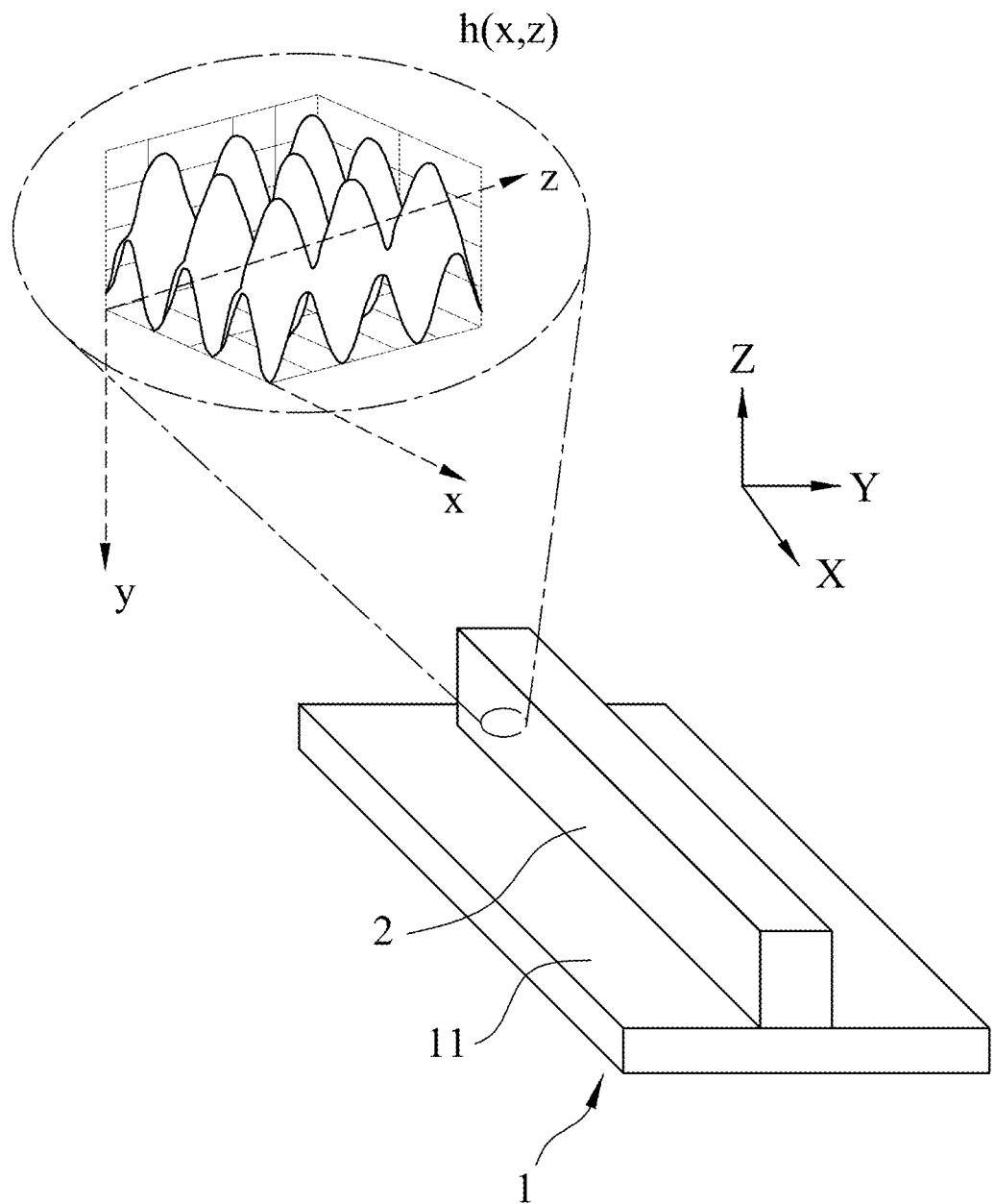
FIG. 2 is a fragmentary view illustrating an embodiment of a two-dimensional grating of the measurement device of this disclosure.
Figure 3:
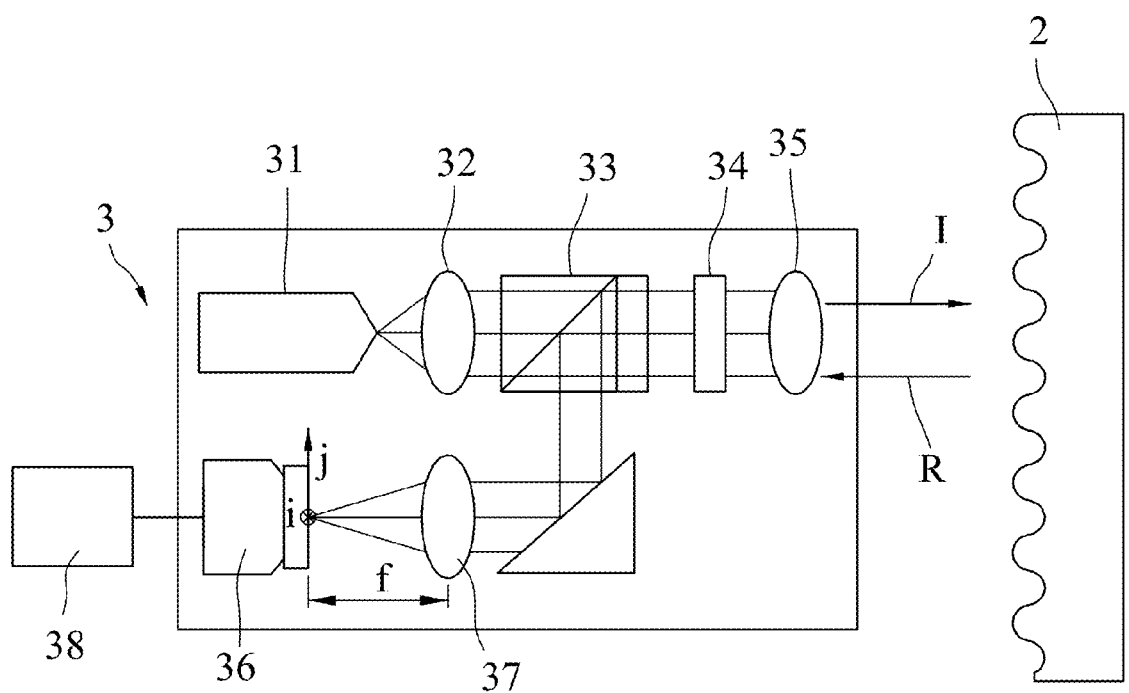
FIG. 3 is a schematic diagram illustrating an embodiment of a measurement unit of the measurement device of this disclosure.

Referring to FIGS. 1 to 3, a first embodiment of a measurement device for a linear stage 1 is illustrated. The linear stage 1 is defined in a coordinate system which has an X-axis, a Y-axis and a Z-axis perpendicular to each other, and includes a first moving stage 11 configured to move in a first moving direction (D1) that is substantially parallel to the X-axis, and a second moving stage 12 configured to move in a second moving direction (D2) that is substantially parallel to the Z-axis. It should be noted that in practice, existence of some errors may cause the first moving direction (D1) and the second moving direction (D2) to deviate from parallelism with respect to the X-axis and the Z-axis, respectively. These errors are to be estimated based on a first rotational angle $\Phi_z$ of the first moving stage 11 about the Z-axis, a second rotational angle $\Phi_x$ of the first moving stage 11 about the X-axis, a first displacement component (a1) of a displacement of the first moving stage 11 on an X-Y plane defined by the X-axis and the Y-axis, and a second displacement component (a2) of the displacement of the first moving stage 11 on an X-Z plane defined by the X-axis and Z-axis. The second displacement component (a2) may be used to quantify vertical vibrations of the first moving stage 11 (i.e., along the Z-axis).

The measurement device includes a two-dimensional grating 2 to be disposed on the first moving stage 11, and a measurement unit 3 to be disposed on the second moving stage 12.

The two-dimensional grating 2 is a reflective-type two-dimensional sinusoidal grating as shown in FIG. 2, and a profile equation of the reflective-type two-dimensional sinusoidal grating is $$h(x, z) = -A_x \cos\left(\frac{2\pi x}{P_x}\right) - A_z \cos\left(\frac{2\pi z}{P_z}\right),$$

where h(x,z) is the profile equation of the reflective-type two-dimensional sinusoidal grating, (x, z) are coordinates on the X-Z plane, $A_x$ and $A_z$ are sinusoidal amplitudes respectively along the X-axis and the Z-axis, and $P_x$ and $P_z$ are sinusoidal wavelengths respectively along the X-axis and the Z-axis. It should be noted that in FIG. 2, the illustration of a profile of the two-dimensional grating 2 is rotated about the X-axis by 90 degrees in the clockwise direction.

As shown in FIG. 3, the measurement unit 3 includes a light source 31, a first lens 32, an optic splitter 33, a polarizer 34, a second lens 35, a two-dimensional sensor 36, a third lens 37 and a processor 38.

The light source 31 is configured to emit incident light (I) to the two-dimensional grating 2 so that the incident light (I) is reflected by the two-dimensional grating 2 to result in reflection light (R).

The first lens 32 is disposed between the light source 31 and the two-dimensional grating 2.

The optic splitter 33 is disposed between the first lens 32 and the two-dimensional grating 2.

The polarizer 34 is disposed between the optic splitter 33 and the two-dimensional grating 2.

The second lens 35 is disposed between the optic splitter 33 and the two-dimensional grating 2. The arrangement of the polarizer 34 and the second lens 35 is not limited to the order illustrated in FIG. 3.

The third lens 37 is disposed on an optical path of the reflection light (R) through the measurement unit 3. The incident light (I) from the light source 31 passes through the first lens 32, the optic splitter 33, the polarizer 34 and the second lens 35 in sequence to the two-dimensional grating 2. The reflection light (R) from the two-dimensional grating 2 passes through the second lens 35, the polarizer 34, the optic splitter 33 and the third lens 37 in sequence to the two-dimensional sensor 36.

The two-dimensional sensor 36 is configured to receive the reflection light (R) and to convert the same to a reflection signal. The two-dimensional sensor 36 is a quadrant sensor, which may be implemented by a quadrant diode, and defines an i-axis and a j-axis that are perpendicular to each other.

The processor 38 is configured to receive the reflection signal from the two-dimensional sensor 36, and to determine based on the reflection signal the first rotational angle $\Phi_z$, the second rotational angle $\Phi_x$, the first displacement component (a1), and the second displacement component (a2).

The first rotational angle $\Phi_z$ is determined based on $$\Phi_z = \frac{d_i}{2f},$$

where f is a distance between a center of the third lens 37 and the two-dimensional sensor 36, and $d_i$ is an i-axis component of a position, on which the reflection light (R) hits, on the two-dimensional sensor 36.

The second rotational angle $\Phi_x$ of the first moving stage 11 about the X-axis is determined based on $$\Phi_x = \frac{d_j}{2f},$$

where $d_j$ is a j-axis component of the position, on which the reflection light hits, on the two-dimensional sensor 36.

The first displacement component (a1) and the second displacement component (a2) are determined by a method disclosed in Taiwanese patent No. I507663. It is worth to note that in the first embodiment, based on different design in length along the Z-axis, the two-dimensional grating 2 may be suitable for measuring errors of movement of the first moving stage 11 on the X-Z plane or, alternatively, for measuring moving distance of the first moving stage 11 on the X-Z plane.

The first embodiment of the measurement device is different from conventional measurement devices in that only one light source and one two-dimensional sensor are required for implementation to realize the measurement of various kinds of dynamic information and/or errors generated in operation of the linear stage. Therefore, the cost of implementation is reduced and the measurement device may be installed with ease.

Figure 4:
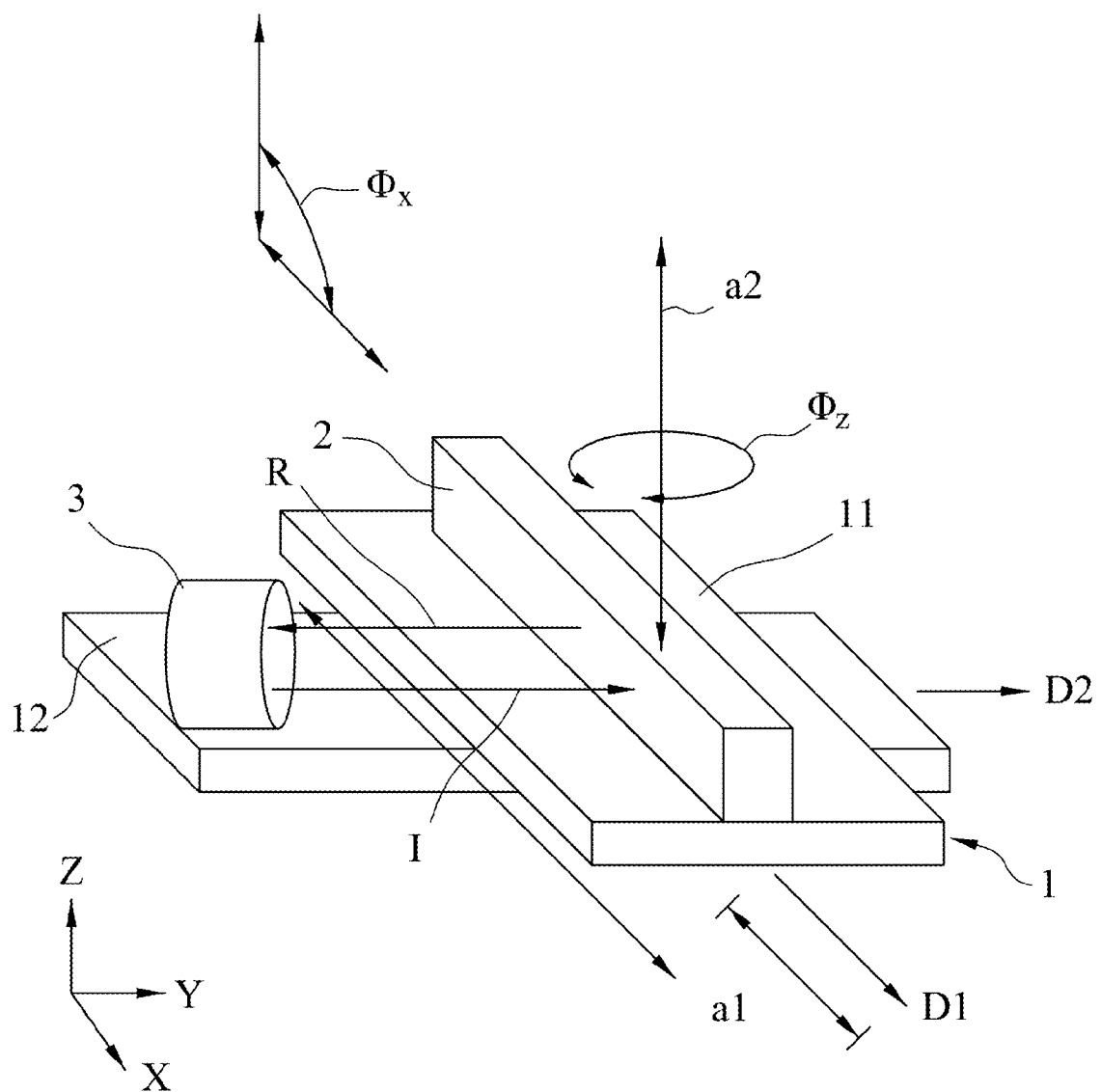
FIG. 4 is a perspective view illustrating a second embodiment of a measurement device for a linear stage according to the disclosure.

Referring to FIG. 4, a second embodiment of the measurement device for the linear stage 1 according the disclosure is illustrated. The second embodiment is similar to the first embodiment, but is different in that the second moving direction (D2) is substantially parallel to the Y-axis. In this embodiment, the first rotational angle $\Phi_z$, the first displacement component (a1) and the second displacement component (a2) are determined in the same way as that in the first embodiment.

In summary, the measurement device of this disclosure determines the displacement and rotational angles of the linear stage 1 by emitting via the light source 31 the incident light (I) to the two-dimensional grating 2 and by analyzing via the two-dimensional sensor 36 and the processor 38 the reflection light (R) reflected therefrom. Since only one light source and one two-dimensional sensor are required to implement the measurement device, the cost of implementation is reduced.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A measurement device for a linear stage, the linear stage being defined in a coordinate system which has an X-axis, a Y-axis and a Z-axis perpendicular to each other, and including a first moving stage configured to move in a first moving direction that is substantially parallel to the X-axis, and a second moving stage configured to move in a second moving direction, said measurement device comprising:

a two-dimensional grating to be disposed on the first moving stage; and a measurement unit to be disposed on the second moving stage, and including a light source that is configured to emit incident light to said two-dimensional grating so that the incident light is reflected by said two-dimensional grating to result in reflection light, a two-dimensional sensor that is configured to receive the reflection light and to convert the reflection light to a reflection signal, and a processor that is configured to receive the reflection signal, and to determine based on the reflection signal a first rotational angle of the first moving stage about the Z-axis, a first displacement component of a displacement of the first moving stage on an X-Y plane defined by the X-axis and the Y-axis, and a second displacement component of the displacement of the first moving stage on an X-Z plane defined by the X-axis and the Z-axis.

2. The measurement device as claimed in claim 1, wherein said measurement unit further includes
   a first lens disposed between said light source and said two-dimensional grating,
   an optic splitter disposed between said first lens and said two-dimensional grating,
   a polarizer disposed between said optic splitter and said two-dimensional grating,
   a second lens disposed between said optic splitter and said two-dimensional grating, and
   a third lens disposed in an optical path of the reflection light through said measurement unit, the incident light from said light source passing through said first lens, said optic splitter, said polarizer and said second lens to said two-dimensional grating, the reflection light from said two-dimensional grating passing through said second lens, said polarizer, said optic splitter and said third lens to said two-dimensional sensor.

3. The measurement device as claimed in claim 1, wherein said two-dimensional grating is a reflective-type two-dimensional sinusoidal grating, and a profile equation of the reflective-type two-dimensional sinusoidal grating is $$h(x, z) = -A_x \cos\left(\frac{2\pi x}{P_x}\right) - A_z \cos\left(\frac{2\pi z}{P_z}\right),$$

where $h(x,z)$ is the profile equation of the reflective-type two-dimensional sinusoidal grating, $(x, z)$ are coordinates on the X-Z plane, $A_x$ and $A_z$ are sinusoidal amplitudes respectively along the X-axis and the Z-axis, and $P_x$ and $P_z$ are sinusoidal wavelengths respectively along the X-axis and the Z-axis.

4. The measurement device as claimed in claim 3, wherein:
   said two-dimensional sensor is a quadrant sensor and defines an i-axis and a j-axis that are perpendicular to each other; and
   said processor is configured to determine the first rotational angle based on $$\Phi_z = \frac{d_i}{2f},$$

where $\Phi_z$ is the first rotational angle, f is a distance between a center of said third lens and said two-dimensional sensor, and $d_i$ is an i-axis component of a position, on which the reflection light hits, on said two-dimensional sensor.

5. The measurement device as claimed in claim 4, the second moving direction being substantially parallel to the Z-axis, wherein said processor is further configured to determine based on the reflection signal a second rotational angle of the first moving stage about the X-axis.

6. The measurement device as claimed in claim 5, wherein:
   said processor is configured to determine a second rotational angle of the first moving stage about the X-axis based on $$\Phi_x = \frac{d_j}{2f},$$

where $\Phi_x$ is the second rotational angle, and $d_j$ is a j-axis component of a position, on which the reflection light hits, on said two-dimensional sensor.

* * * * *